(12) United States Patent
Perez et al.

(10) Patent No.: US 9,875,855 B2
(45) Date of Patent: Jan. 23, 2018

(54) HIGH VOLTAGE TANTALUM CAPACITOR WITH IMPROVED CATHODE/SEPARATOR DESIGN AND METHOD OF MANUFACTURE

(71) Applicant: Greatbatch Ltd., Clarence, NY (US)

(72) Inventors: Anthony C. Perez, North Tonawanda, NY (US); Barry C. Muffoletto, Alden, NY (US); Jason T. Hahl, East Aurora, NY (US); Mark T. Muffoletto, Darien Center, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 15/334,813

(22) Filed: Oct. 26, 2016

(65) Prior Publication Data

US 2017/0125177 A1    May 4, 2017

Related U.S. Application Data

(60) Provisional application No. 62/248,695, filed on Oct. 30, 2015.

(51) Int. Cl.

| | |
|---|---|
| *H01G 9/02* | (2006.01) |
| *H01G 11/52* | (2013.01) |
| *H01G 11/28* | (2013.01) |
| *H01G 11/46* | (2013.01) |
| *H01G 11/58* | (2013.01) |
| *H01G 11/80* | (2013.01) |
| *H01G 11/74* | (2013.01) |
| *H01G 11/30* | (2013.01) |

(52) U.S. Cl.
CPC ............. *H01G 11/52* (2013.01); *H01G 11/28* (2013.01); *H01G 11/30* (2013.01); *H01G 11/46* (2013.01); *H01G 11/58* (2013.01); *H01G 11/74* (2013.01); *H01G 11/80* (2013.01)

(58) Field of Classification Search
CPC ....................................................... H01G 9/02
See application file for complete search history.

(56) References Cited

U.S. PATENT DOCUMENTS

| | | | |
|---|---|---|---|
| 5,894,403 A | 4/1999 | Shah et al. | |
| 5,920,455 A | 7/1999 | Shah et al. | |
| (Continued) | | | |

FOREIGN PATENT DOCUMENTS

| | | |
|---|---|---|
| EP | 0877400 | 11/1998 |
| EP | 1205987 | 5/2002 |

OTHER PUBLICATIONS

European Search Report, Application No. 16196403.6, dated Mar. 3, 2017.

*Primary Examiner* — Eric Thomas
(74) *Attorney, Agent, or Firm* — Michael F. Scalise

(57) ABSTRACT

A wet tantalum capacitor of either a single anode design or of multiple anode configurations having cathode active material supported on the casing and sealed in its own separator material is described. The separator "covers" the cathode active material and is adhered directly to the casing. For a multiple anode design, an inner cathode foil positioned between opposed anode pellets is sealed in its own separator bag. Preferably, a polymeric restraining device prevents the anode from contacting the casing. The completed anode/cathode electrode assembly is sealed in the casing, which is filled with electrolyte thru a port. The fill port is hermetically sealed to complete the capacitor.

23 Claims, 8 Drawing Sheets

(56) References Cited

U.S. PATENT DOCUMENTS

| | | | |
|---|---|---|---|
| 5,926,362 A * | 7/1999 | Muffoletto | H01G 9/04 |
| | | | 361/503 |
| 6,219,222 B1 | 4/2001 | Shah et al. | |
| 6,224,985 B1 | 5/2001 | Shah et al. | |
| 6,334,879 B1 | 1/2002 | Muffoletto et al. | |
| 6,468,605 B2 | 10/2002 | Shah et al. | |
| 6,687,117 B2 | 2/2004 | Liu et al. | |
| 6,721,170 B1 | 4/2004 | Evans et al. | |
| 6,819,544 B1 | 11/2004 | Nielsen et al. | |
| 6,850,405 B1 | 2/2005 | Stemen et al. | |
| 7,012,799 B2 | 3/2006 | Muffoletto et al. | |
| 7,072,171 B1 | 7/2006 | Muffoletto et al. | |
| 7,085,126 B2 | 8/2006 | O'Connor et al. | |
| 7,092,242 B1 | 8/2006 | Gloss et al. | |
| 7,116,547 B2 | 10/2006 | Seitz et al. | |
| 7,483,260 B2 | 1/2009 | Ziarniak et al. | |
| 7,813,107 B1 * | 10/2010 | Druding | H01G 9/008 |
| | | | 361/508 |
| 7,983,022 B2 * | 7/2011 | O'Connor | A61N 1/375 |
| | | | 361/508 |
| 8,027,149 B2 | 9/2011 | Hahl et al. | |
| 8,086,312 B2 | 12/2011 | Norton et al. | |
| 9,312,075 B1 | 4/2016 | Liu et al. | |
| 2003/0090857 A1 | 5/2003 | Liu et al. | |
| 2014/0287277 A1 | 9/2014 | Mehta et al. | |

* cited by examiner

HIGH VOLTAGE TANTALUM CAPACITOR WITH IMPROVED CATHODE/SEPARATOR DESIGN AND METHOD OF MANUFACTURE

CROSS-REFERENCE TO RELATED APPLICATION

This application claims priority to U.S. provisional patent application Ser. No. 62/248,695, filed on Oct. 30, 2015.

BACKGROUND OF THE INVENTION

1. Field of the Invention

The present invention generally relates to a capacitor, and more particularly, to a capacitor having a cathode spaced from an anode. The cathode is of an active material supported on a casing sidewall or a conductive substrate in contact with the casing sidewall. The anode is typically in the form of a sintered valve metal pellet, such as a sintered tantalum pellet that has been anodized and subjected to a formation step. The anode and cathode are kept from direct physical contact with each other by a separator that covers the cathode with a margin of the separator secured to the casing sidewall adjacent to the cathode material.

Conventional designs have the anode contained in a separator that surrounds and envelopes the anode pellet.

2. Prior Art

FIGS. 1 and 2 are side and top cross-sectional views respectively of a flat electrolytic capacitor 10 according to the prior art. The prior art capacitor 10 comprises an anode 12 and a cathode 14 housed inside a hermetically sealed casing 16. The capacitor electrodes are contacted with a working electrolyte (not shown) contained inside casing 16. Casing 16 includes a deep drawn can 18 having a generally rectangular shape comprised of spaced apart sidewalls 20 and 22 meeting with opposed end walls 24 and 26, the sidewalls 20, 22 and end walls 24, 26 extending upwardly from a bottom wall 28. A lid 30 is secured to sidewalls 20 and 22 and end walls 24 and 26 by a weld 32 to complete the casing 16. Casing 16 is made of a conductive metal and serves as one terminal or contact for making electrical connection between the capacitor and its load.

Anode 12 is in the form of a sintered pellet of a material selected from the group consisting of tantalum, aluminum, titanium, niobium, zirconium, hafnium, tungsten, molybdenum, vanadium, silicon, germanium, and mixtures thereof. As well known to those skilled in the art, after sintering, the anode pellet is anodized.

Cathode 14 is spaced from the anode 12 and comprises conductive substrates 34 supporting a cathode active material 36. In FIGS. 1 and 2, the conductive substrates 34 are the casing sidewalls 20, 22. While not shown in the drawings, the conductive substrates 34 can alternatively be a separate conductive member that is contacted to the inner surface of the casing sidewalls 20, 22. Ruthenium oxide is one of a number of suitable cathode active materials.

A separator structure includes spaced apart sheets 38 and 40 of insulative material, for example a microporous polyolefinic film. The separator sheets 38 and 40 are connected to a polymeric ring 42 and disposed intermediate anode 12 and the coated sidewalls 20, 22 serving as the cathode.

Alternatively, the polymer ring 42 is eliminated and the separator sheets 38, 40 are secured to each other adjacent to their edges.

The other electrical terminal or contact is provided by a conductor or lead 44 extending from the anode 12 and through lid 30. Lead 44 is electrically insulated from lid 30 by an insulator and seal structure 46. The anode 12 is provided with a notch forming a step 48 adjacent to end wall 26 of can 18. Step 48 provides clearance for the insulator and seal structure 46. In that manner, the portion of anode terminal lead 44 extending outside the capacitor 10 for connection to the load is hermetically sealed from the interior of the capacitor 10 and electrically insulated from the can 18 and lid 30 serving as the terminal for the cathode 14.

An electrolyte fill opening is provided for filling an electrolyte (not shown) into the capacitor, after which this opening is sealed with closure member 50 that is preferably welded in place.

While positioning the anode in a separator envelope to prevent the opposite polarity electrodes from contacting each other is acceptable, there is a desire to improve manufacturability of capacitors, for example electrolytic capacitors. Improved manufacturability is realized by covering the cathode with a separator material instead of containing a sintered pellet-type valve metal anode in a separator envelope.

SUMMARY OF THE INVENTION

The present invention describes a structure and method for physically isolating the cathode material from the anode in a wet tantalum capacitor. The capacitor can be of either a single anode design or of multiple anode configurations. The cathode that is supported on the case, and or lid is sealed in its own separator material, which is adhered directly to the case or lid. For a multiple anode design, an inner cathode foil positioned between opposed anode pellets is sealed in its own separator bag. Preferably, a restraining device made of a polymeric material such as polypropylene, PTFE or polyester, but not limited to these materials is used to prevent the anode from contacting the case. The completed anode assembly is then inserted into a case half, such as in a mating clamshell case design and welded into place. The second case half is secured to the first case half, preferably with a hermetic seal and the casing is filled with electrolyte thru a port (not shown) and the fill port is hermetically sealed to complete the capacitor.

An advantage of this design over conventional capacitors where the opposite polarity electrodes are prevented from direct physical contact with each other by enveloping the anode in its own separator bag is that the number of heat seal layers is minimized. This allows for larger anodes, thereby increasing packaging efficiency.

These and other objects of the present invention will become increasingly more apparent to those skilled in the art by reference to the following detailed description and the appended drawings.

The present invention will be described in connection with preferred embodiments, however, it will be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

Figure 1:
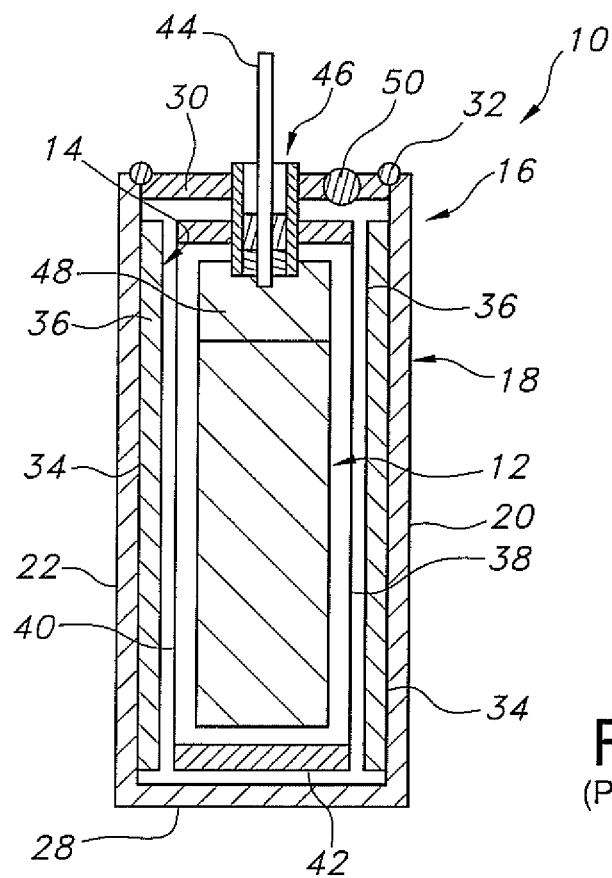
FIGS. 1 and 2 are side and top cross-sectional views of an exemplary capacitor 10 according to the prior art.
Figure 2:
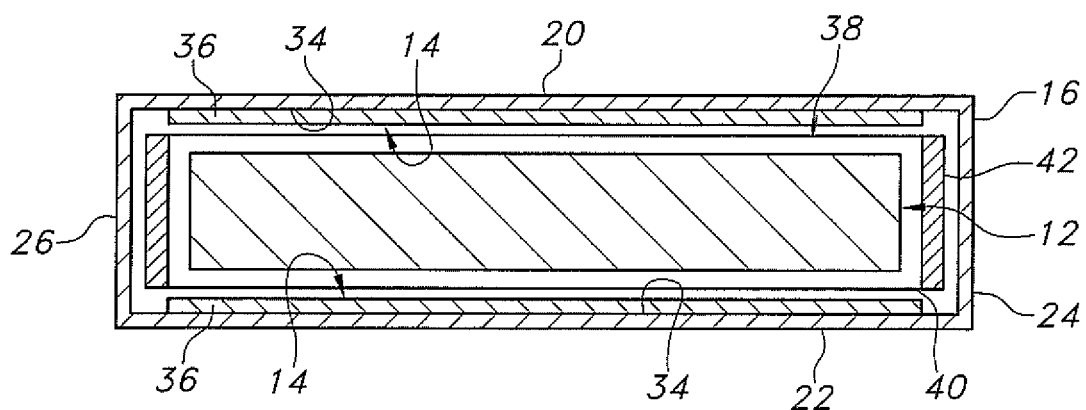
Figure 3:
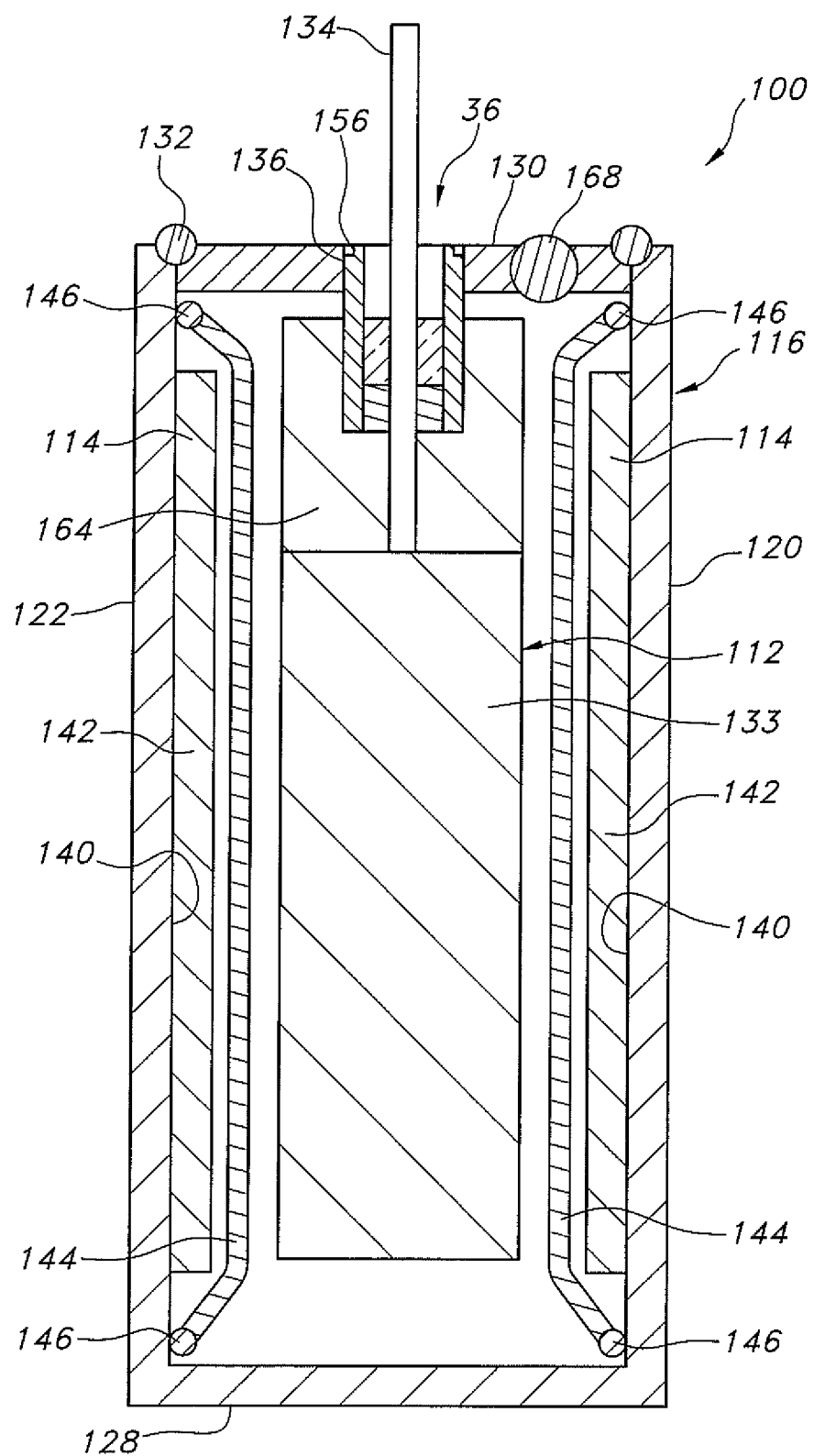
FIG. 3 is a side cross-sectional view of an exemplary capacitor 100 according to the present invention.

Turning now to the drawings, FIG. 3 is a perspective view of one embodiment of a capacitor 100 according to the present invention. The capacitor 100 is preferably an electrolytic-type capacitor comprising an anode 112 and a cathode 114 housed inside a hermetically sealed casing 116. The capacitor electrodes are contacted with a working electrolyte (not shown) contained inside casing 116.

Figure 4:
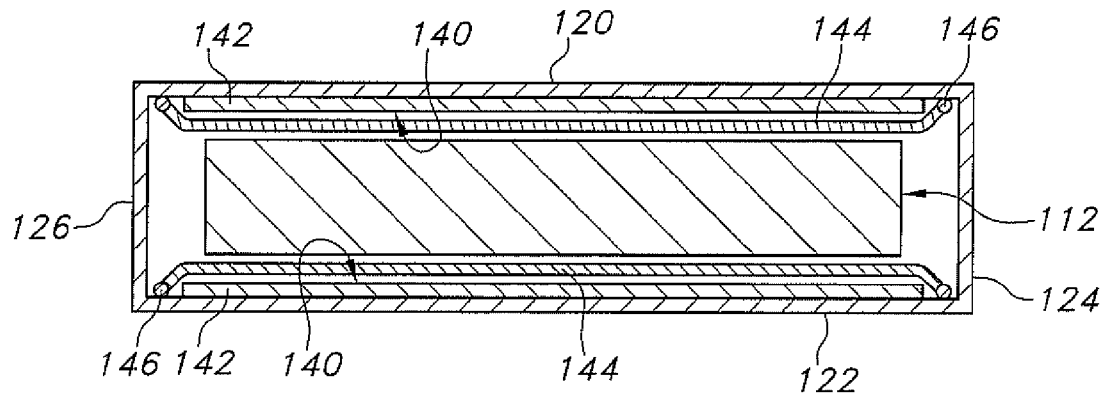
FIG. 4 is a top cross-sectional view of the exemplary capacitor 100 shown in FIG. 3 according to the present invention.

Casing 116 is a deep drawn can of a generally prismatic shape having a similar form factor as the casing 16 for the prior art capacitor 10 described above with respect to FIGS. 3 and 4, and comprises spaced apart sidewalls 120 and 122 meeting with opposed end walls 124 and 126, the sidewalls 120, 122 and end walls 124, 126 extending upwardly from a bottom wall 128. A lid 130 is secured to sidewalls 120 and 122 and end walls 124 and 126 by a weld 132. Casing 116 is made of a conductive metal selected from the group consisting of tantalum, titanium, nickel, niobium, stainless steel, aluminum, zirconium, and mixtures and alloys thereof. Regardless the metal, casing 116 has a thickness of about 0.015 to about 0.5 millimeters and serves as one terminal or contact for making electrical connection between the capacitor and its load.

The anode 112 is typically of a metal selected from the group consisting of tantalum, aluminum, titanium, niobium, zirconium, hafnium, tungsten, molybdenum, vanadium, silicon and germanium, and mixtures thereof in the form of a pellet. As is well known by those skilled in the art, the anode metal in powdered form, for example tantalum powder, is compressed into a pellet 133 having an anode lead 134 extending therefrom and sintered under a vacuum at high temperatures.

A preferred tantalum material and method of manufacturing an anode pellet for the present capacitor, which is well suited for implantable cardiac device capacitor applications, is described in U.S. Pat. No. 9,312,075 to Liu et al., which is assigned to the assignee of the present invention and incorporated herein by reference.

Before pressing, the tantalum powder is typically, but not necessarily, mixed with approximately 0 to 5 percent of a binder such as ammonium carbonate. This and other binders are used to facilitate metal particle adhesion and die lubrication during anode pressing. The powder and binder mixture are dispended into a die cavity and are pressed to a density of approximately 4 grams per cubic centimeter to approximately 8 grams per cubic centimeter. Binder is then removed from the anode pellet 133 either by washing in warm deionized water or by heating at a temperature sufficient to decompose the binder. Complete binder removal is desirable since residuals may result in high leakage current. The washed anode pellet is then vacuum-sintered at between about 1,350° C. to about 1,600° C. to permanently bond the metal anode particles.

An oxide is formed on the surface of the sintered anode by immersing the anode in an electrolyte and applying a current. The electrolyte includes constituents such as water and phosphoric acid and perhaps other organic solvents. The application of current drives the formation of an oxide film that is proportional in thickness to the targeted forming voltage. A pulsed formation process may be used wherein current is cyclically applied and removed to allow diffusion of heated electrolyte from the internal pores of the anode. Intermediate washing and annealing steps may be performed to facilitate the formation of a stable, defect free, oxide. Preferably, the anode pellet 133 is anodized to a formation voltage formation voltage that is greater than zero up to 550 V.

Cathode 114 is spaced from the anode 112 and comprises conductive substrates 140 supporting a cathode active material 142 having a thickness of about a few hundred Angstroms to about 0.1 millimeters. In FIG. 3, the clamshell casing sidewalls 120, 122 serve as the conductive substrates. While not shown in the drawing, the conductive substrates 140 can alternatively be a separate conductive member that is contacted to the inner surface of the clamshell sidewalls 120, 122. The conductive substrates 140, and hence the clamshell sidewalls 120, 122, are selected from the group consisting of titanium, tantalum, nickel, niobium, stainless steel, aluminum, zirconium, and mixtures and alloys thereof.

The cathode active material 142 may be selected from those described above or selected from the group including graphitic or glassy carbon on titanium carbide, carbon and silver vanadium oxide on titanium carbide, carbon and crystalline manganese dioxide on titanium carbide, platinum on titanium, ruthenium on titanium, barium titanate on titanium, carbon and crystalline ruthenium oxide on titanium carbide, carbon and crystalline iridium oxide on titanium carbide, silver vanadium oxide on titanium, and activated carbon.

The cathode active material 142 contacted to the casing sidewalls 120, 122 serving as the conductive substrates 140 is preferably spaced from the bottom wall and upper edge at the lid 130. Such a cathode active coating is accomplished by providing the conductive sidewalls 120 and 122 with a masking material in a known manner so that only the intended areas of the sidewalls are contacted with active material. The masking material is removed from the sidewalls 120, 122 prior to capacitor fabrication. As will be described in detail hereinafter, the masking material must leave an open area of the sidewalls 120, 122 that is sufficient for contact with a separator material according to the present invention.

In that respect, the clamshell sidewalls 120 and 122 may support an anodized-etched conductive material, or have a sintered active material with or without oxide contacted thereto, or be contacted with a double layer capacitive material, for example a finely divided carbonaceous material such as graphite, carbon, activated carbon, or platinum black, or be contacted with a redox, pseudocapacitive or an under potential material, or an electroactive conducting polymer such as polyaniline, polypyrrole, polythiophene, and polyacetylene, and mixtures thereof.

According to one preferred aspect of the present invention, the redox or cathode active material 142 includes an oxide of a first metal, the nitride of the first metal, the carbon nitride of the first metal, and/or the carbide of the first metal, the oxide, nitride, carbon nitride and carbide having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead.

The cathode active material 142 may also include a second or more metals. The second metal is in the form of an oxide, a nitride, a carbon nitride or carbide, and is not essential to the intended use of the conductive sidewalls 120 and 122 as a capacitor electrode. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the invention, the cathode active material includes an oxide of ruthenium or oxides of ruthenium and tantalum.

As disclosed in U.S. Pat. No. 7,116,547 to Seitz et al., a preferred coating process is by pad printing. This patent is assigned to the assignee of the present invention and incorporated herein by reference. An ultrasonically generated aerosol, as described in U.S. Pat. Nos. 5,894,403, 5,920,455, 6,224,985, and 6,468,605, all to Shah et al., is also suitable for making a coating of the active materials. These patents are assigned to the assignee of the present invention and incorporated herein by reference. In that manner, the ultrasonically generated active material contacted to the conductive surfaces has a majority of its particles with diameters of less than about 10 microns. This provides an internal surface area for the active material of about 10 m$^2$/gram to about 1,500 m$^2$/gram.

A separator 144 of electrically insulative material is provided between the anode 112 and the cathode 114 to prevent an internal electrical short circuit between the electrodes. The separator 144 is chemically unreactive with the anode and cathode active materials and both chemically unreactive with and insoluble in the electrolyte. In addition, the separator material has a degree of porosity sufficient to allow ionic conduction therethrough during charging and discharging of the capacitor 100.

Figure 5:
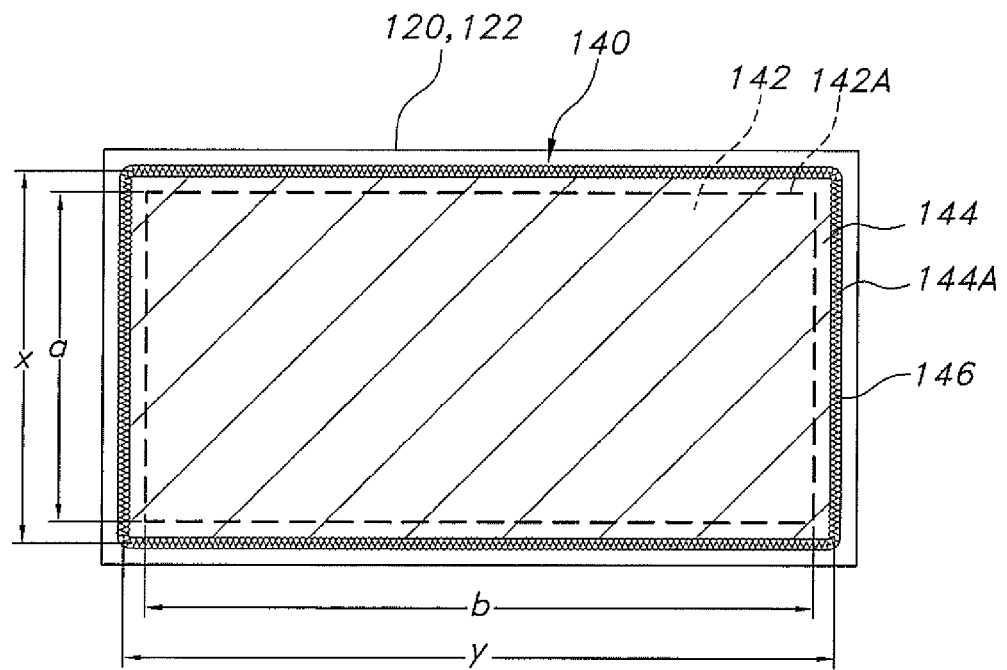
FIG. 5 is a plan view showing an exemplary embodiment of a separator sheet 144 covering a cathode active material 142 contacted to a conductive substrate 120, 122.

According to the present invention, individual separator sheets 144 of electrically insulative material completely surround and envelop the cathode active material 142 contacted to the casing sidewalls 120, 122. As shown in the plan view of FIG. 5, the exemplary separator 144 has height and width or "x" and "y" dimensions that are larger than the height and width or "a" and "b" dimensions of the cathode active material 142, and is contacted to the casing sidewalls 120, 122 to cover the active material. The separator 144 has a perimeter edge or margin 144A secured to the inner surface of the sidewall 120, 122 adjacent to a perimeter 142A of the cathode active material 142. It should be understood that the illustration of separator 144 covering the active material 142 in FIG. 5 is exemplary. In practice, the active material can have a myriad of different shapes dictated by the form factor of a particular capacitor design. Regardless the specific shape of the active material 142 and its exemplary x and y dimensions, the separator 144 is sized and shaped to cover the cathode active material 142 with the margin 144A secured to the conductive substrate 140 in a surrounding relationship.

The separators 144 are secured to the inner surfaces of the respective casing sidewalls 120, 122 using any one of a number of materials including an adhesive 146, such as hot melt glue (MasterBond MB514), epoxy (Tam Tech Polypropylene, polyethylene adhesive/glue), and PET tape with an acrylic adhesive (3M VBH Tapes). That way, the cathode active material 142 is contained in an envelope comprising the casing sidewall 120, 122 to which it is contacted (or a conductive substrate 140 in electrical contact with the inner surface of the casing sidewalls) and the covering separator 144 secured to the inner surface of the casing sidewall by the adhesive material 146 so that the separator 144 is in a surrounding relationship adjacent to a perimeter edge 142A of the cathode active material 142.

Illustrative separator materials include woven and non-woven fabrics of polyolefinic fibers including polypropylene and polyethylene, or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLOPOR®, (DMS Solutech); a polytetrafluoroethylene membrane commercially available under the designation ZITEX®, (Chemplast Inc.) or EXCELLERATOR®, (W.L. Gore and Associates); a polypropylene membrane commercially available under the designation CELGARD®, (Celgard LLC); and a membrane commercially available under the designation DEXIGLAS®, (C. H. Dexter, Div., Dexter Corp.). Cellulose based separators also typically used in capacitors are contemplated by the scope of the present invention. Depending on the electrolyte used, the separator 144 can be treated to improve its wettability, for example with a surfactant, as is well known by those skilled in the art.

Figure 6:
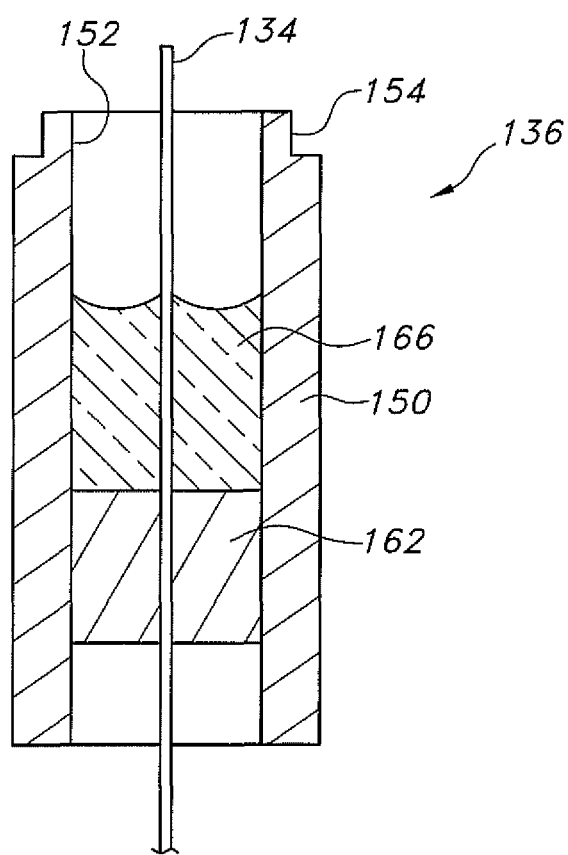
FIG. 6 is a fragmentary, cross-sectional view of an insulator and seal structure 136 for a terminal lead 134 for the capacitor 100.

The anode conductor or lead 134 preferably comprises the same material as the anode 112 and extends from within the capacitor through casing 116 and, in particular, through lid 130 to serve as the positive terminal or contact. As shown in FIG. 6, lead 134 is electrically insulated from lid 130 by the insulator and seal structure 136. The anode 112 is provided with a notch forming a step 164 adjacent to one of the end walls 124, 126 of casing 116. The anode step 164 provides clearance for the insulator and seal structure 136.

In one embodiment, the insulator and seal structure 136 for the terminal lead 134 comprises a header or ferrule element 150 defining an internal cylindrical through bore or passage 152. An outwardly facing step 154 is provided at the upper end of ferrule 150 having an outer surface sized to fit in an opening 156 (FIG. 3) in lid 130 with the upper end of ferrule 150 secured therein by welding and the like.

The anode lead 134 is secured and sealed within ferrule by a series of sealing materials. A first layer 162 is provided by a synthetic polymeric material such as elastomeric materials that are capable of sealing between lead 134 and the inner surface of ferrule 150. A suitable material for the first layer 162 is, for example Master-Sil 151 made by Master Bond.

Finally, a glass layer 166 provides a hermetic seal between the inside of the ferrule 150 and the anode lead 134. The glass is, for example, Elan Type 88 or Mansol Type 88. Alternatively, a suitable insulator and seal structure is provided without using glass 166. While such a seal structure is not necessarily hermetic, acceptable isolation of the electrolyte from inside the casing 116 to the outside thereof is provided by the first polymer layer 162.

A fill opening or port in the casing 116 is provided for filling a working electrolyte (not shown) into the capacitor, after which this opening is sealed with closure member 168, which is preferably welded in place. A suitable working electrolyte for the capacitor 100 is described in U.S. Pat. No. 6,219,222 to Shah et al., which includes a mixed solvent of water and ethylene glycol having an ammonium salt dissolved therein. U.S. Pat. No. 6,687,117 and U.S. Patent Application Pub. No. 2003/0090857, both to Liu et al., describe other electrolytes that are useful with the present capacitor 100. The electrolyte of the latter publication comprises water, a water-soluble inorganic and/or organic acid and/or salt, and a water-soluble nitro-aromatic compound while the former relates to an electrolyte having de-ionized water, an organic solvent, isobutyric acid and a concentrated ammonium salt. These patents and publications are assigned to the assignee of the present invention and incorporated herein by reference.

Filling is accomplished by placing the capacitor 100 in a vacuum chamber such that the electrolyte fill port extends into a reservoir of electrolyte. When the chamber is evacuated, pressure is reduced inside the capacitor. When the vacuum is released, pressure inside the capacitor re-equilibrates, and electrolyte is drawn through the fill port into the capacitor.

Figure 7:
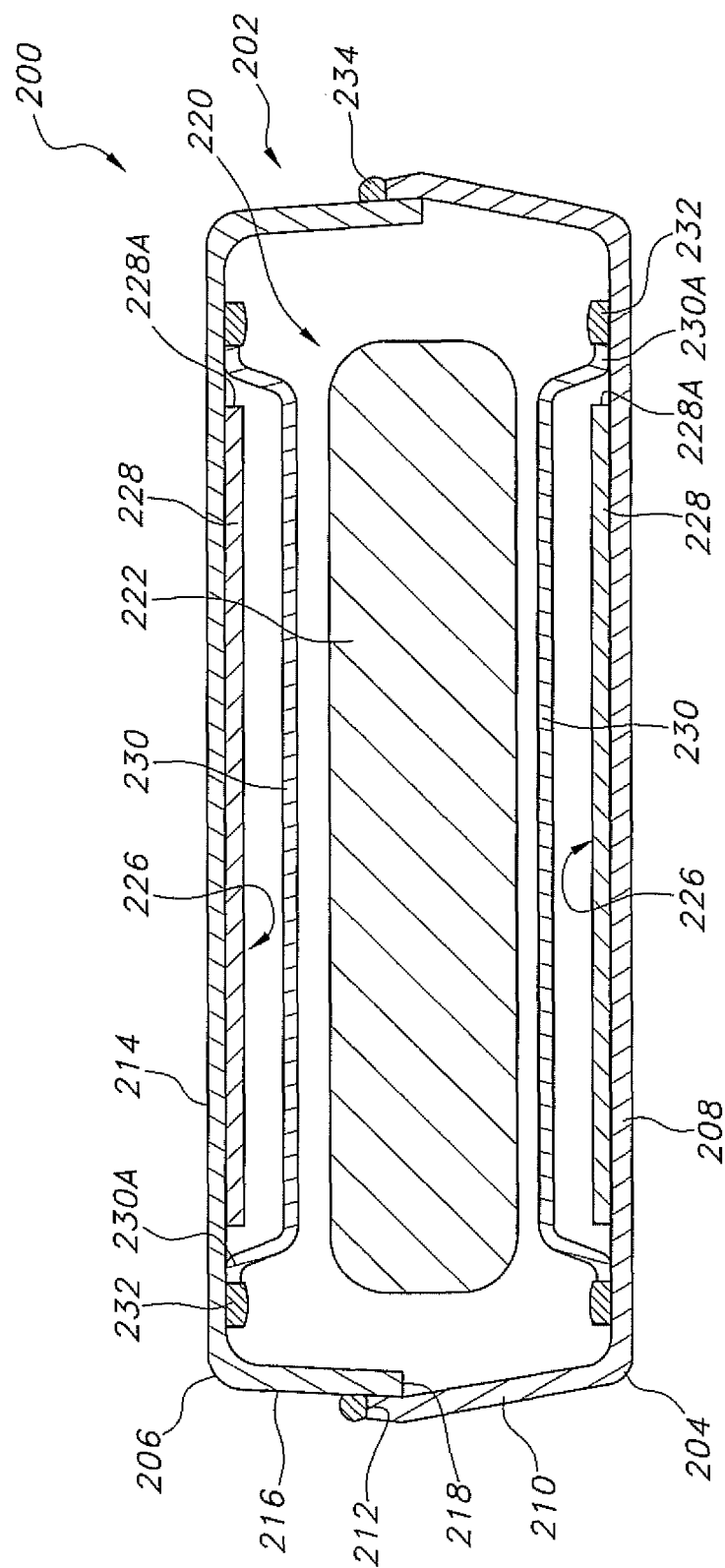
FIG. 7 is a top cross-sectional view of an exemplary capacitor 200 according to the present invention housed in a casing 202 of mating clamshells 204, 206.

Another embodiment of a capacitor 200 according to the present invention is illustrated in FIG. 7. Capacitor 200 includes a casing 202 comprising first and second mating metal clamshell-shaped casing members 204 and 206. First clamshell member 204 comprises a first face wall 208 joined to a surrounding sidewall 210 extending to an edge 212. Second clamshell member 206 is similar to the first casing member 204 and has a second face wall 214 joined to a surrounding sidewall 216 extending to an edge 218.

In a similar manner as described with respect to the capacitor 100 illustrated in FIGS. 3 to 6, the anode 220 for capacitor 200 comprises a sintered valve metal pellet 222 and a lead, for example embedded anode leads 324A, 324B (FIG. 10) or weld connected leads 325A, 325B (FIG. 11) extending therefrom. Although any one of the number of suitable anode materials described with respect to capacitor 100 are contemplated by this embodiment, tantalum is preferred. Before incorporation into the capacitor, the valve metal pellet 222, and the weld (FIG. 11) if it exists, is anodized in a suitable electrolyte and then subjected to formation protocol to a target operating voltage.

Cathode 226 is spaced from the anode 220 and comprises a cathode active material 228, for example ruthenium oxide, of a suitable thickness supported on an inner surface of the first and second face walls 208, 214.

According to the present invention, a separator 330 of insulative, but allowing ion transfer therethrough covers the cathode active material 228 supported on the inner surfaces of the first and second face walls 208, 214. As with capacitor 100, the separator 230 is sized and shaped to cover the cathode active material 228 with a peripheral margin 230A contacting the inner surfaces of the face walls 208, 214 adjacent to a perimeter edge 228A of the cathode active material 228. The separator margin 230A is secured to the inner surface of the first and second face walls 208, 214 by one of the suitable adhesives 232 described for that purpose with respect to capacitor 100.

After the anode 220 and cathode 226 are housed in the casing 202, the first clamshell member 204 is mated with the second clamshell member 206 having their surrounding sidewalls 210, 216 in an overlapping relationship adjacent to their edges 212, 218. An annular weld 234, preferably a laser weld, hermetically secures the overlapping sidewalls 210, 216 together. Finally, a working electrolyte (not shown) is filled into the casing 202 and the fill opening is sealed with a plug (not shown).

Figure 8:
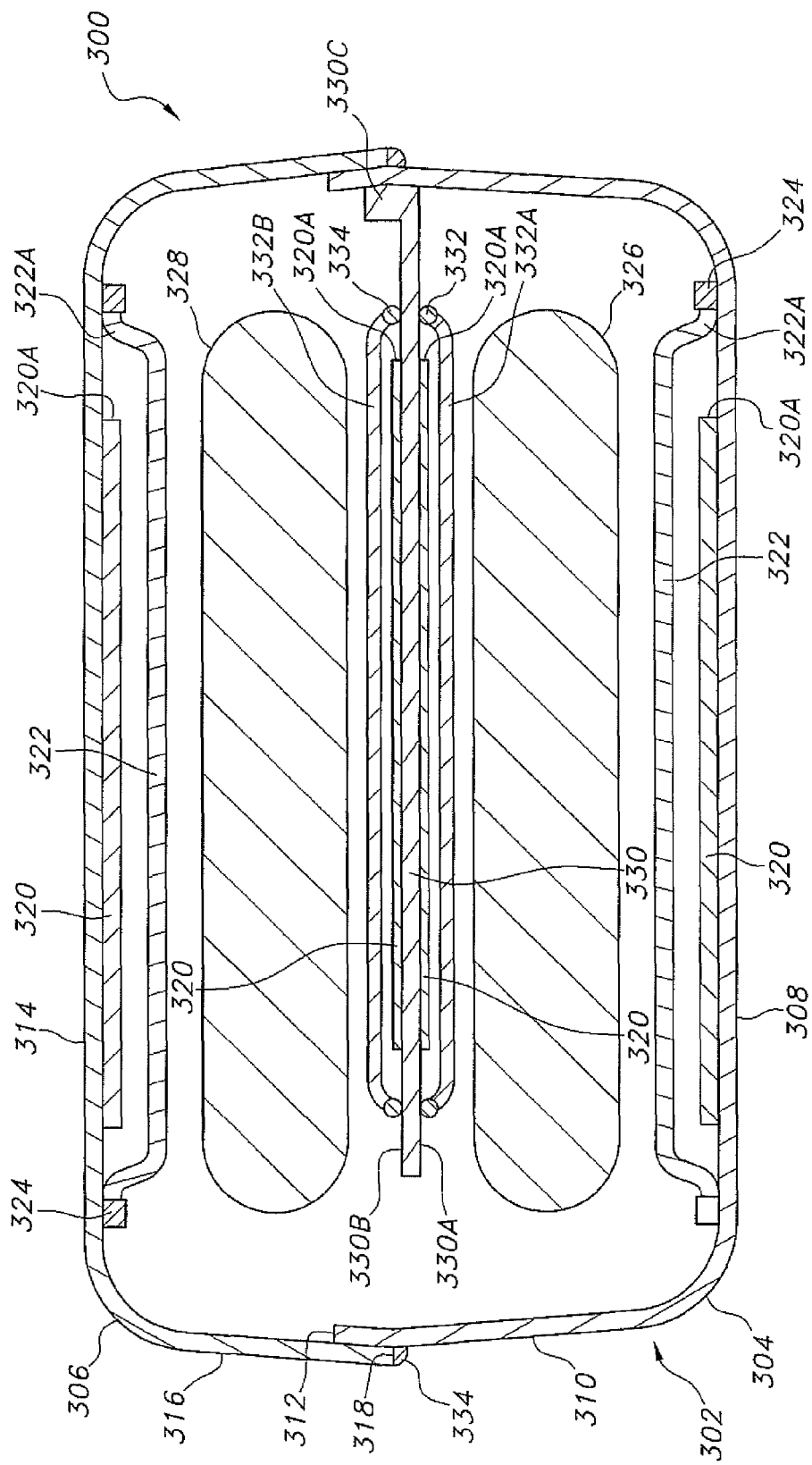
FIG. 8 is a top cross-sectional view of an exemplary capacitor 300 according to the present invention having a dual anode design.

FIG. 8 illustrates another embodiment of a capacitor 300 according to the present invention. Capacitor 300 includes a casing 302 comprising mating first and second clamshell-shaped casing members 304, 306. Casing member 304 comprises a first face wall 308 joined to a surrounding sidewall 310 extending to an edge 312. Similarly, the second casing member 306 comprises a second face wall 314 joined to a surrounding sidewall 316 extending to an edge 318.

Cathode active material 320 is contacted to an inner surface of the face walls 308, 314. A separator 322 of insulative, but allowing ion transfer therethrough covers the cathode active material 320 supported on the inner surfaces of the first and second face walls 308, 314. According to the present invention, the separators 322 are sized and shaped to cover the cathode active material 320 with a peripheral margin 322A contacting the face walls 308, 314 adjacent to a perimeter edge 320A of the cathode active material. The separator margin 322A is secured to the inner surface of the first and second casing member 304, 306 by one of the suitable adhesives 324 described for that purpose with respect to capacitors 100 and 200.

Capacitor 300 is of a dual anode design and further includes parallel connected sintered valve metal pellets 326 and 328, preferably of tantalum, serving as the anode. As before, the valve metal pellets 326, 328 are anodized and subjected to a formation protocol prior to being incorporated into the capacitor.

Capacitor 300 further includes cathode active material 320 supported on the opposed surfaces 330A and 330B of a cathode current collector 330 that is positioned intermediate the anode pellets 326, 328. The cathode current collector 330 is preferably in the form of a foil. Two sheets of separator material 332A and 332B cover the cathode active material 320. According to the present invention, the sheets 332A, 332B are sized and shaped so that their peripheral margins contact the cathode current collector 330 adjacent to a perimeter edge 320A of the cathode active material. The separators 332A, 332B are secured to the opposed surfaces 330A, 330B of the cathode current collector 330 using one of the suitable adhesives 334 described for this purpose with respect to capacitors 100 and 200.

Tab 330C of cathode current collector 330 is then welded to the inside surface of clamshell 304 to electrically connect the current collector to the casing 302.

After the anodes 326, 328 and cathode 320 are housed in the casing 302, the first clamshell member 304 is mated with the second clamshell member 306 having their surrounding sidewalls 312, 216 in an overlapping relationship. An annular weld 334, preferably a laser weld, hermetically secures the overlapping clamshell sidewalls 310, 316 together adjacent to their respective edges 312, 318. Finally, a working electrolyte (not shown) is filled into the casing 302 and the fill opening is sealed with a plug (not shown).

Figure 9:
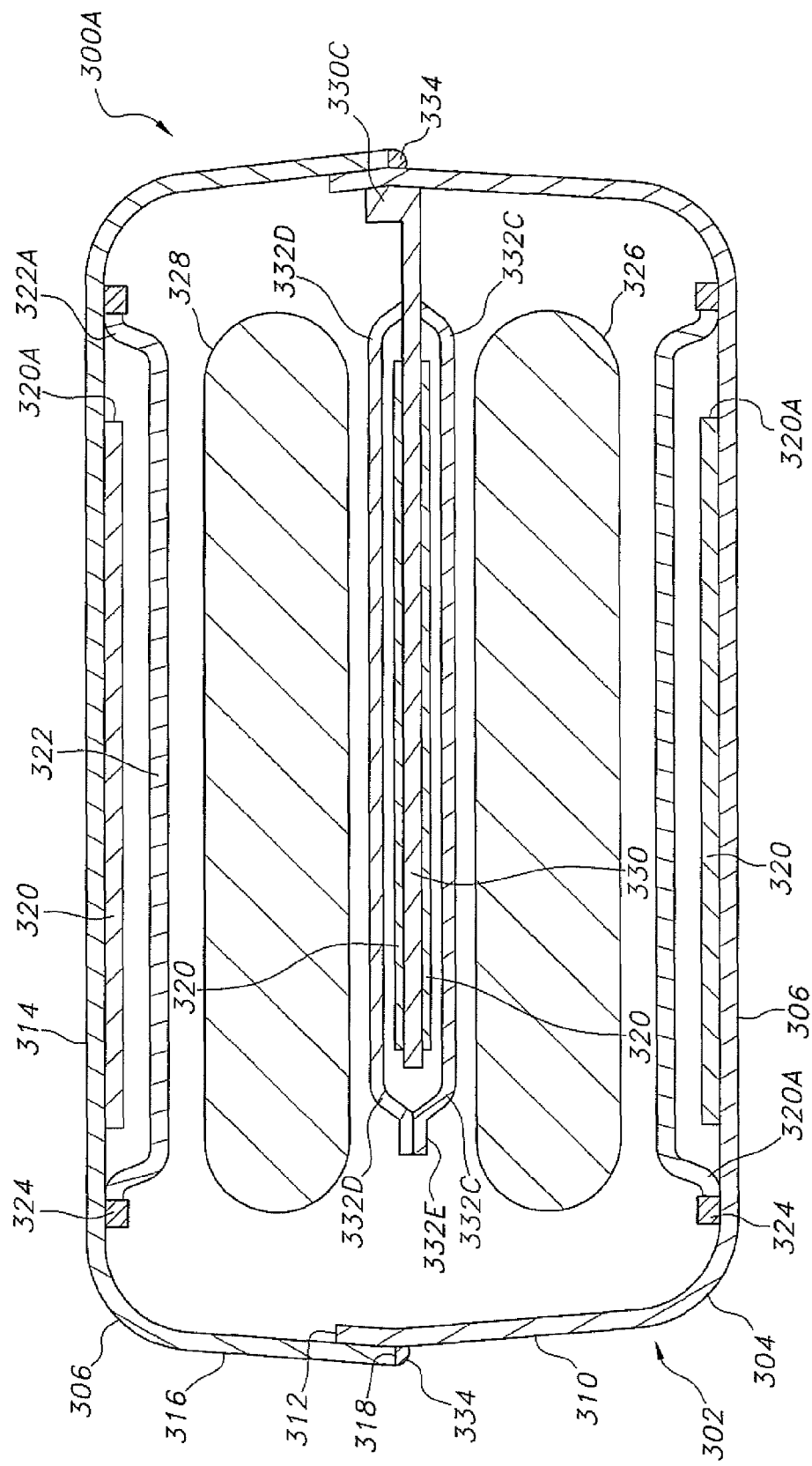
FIG. 9 is a top cross-sectional view of another exemplary capacitor 300A according to the present invention having a dual anode design.

FIG. 9 illustrates another embodiment of a capacitor 300A according to the present invention. Capacitor 300A is similar to capacitor 300 described with respect to FIG. 8 with the exception of the separator structure for the cathode portion disposed intermediate the anode pellets 326, 328. In this embodiment, the separator is an envelope formed of at least two sheets 332C, 332D that are sealed to each other, such as at the location indicated by numerical designation 332E in the cross-sectional view. At the opposite end of the cathode, the connected separator sheets 332C, 332O include an opening through which the current collector 330 extends to tab 330C. This opening in the separator sheets may be additionally sealed with an adhesive material (not shown). The current collector tab 330C is secured to the casing, such as by a weld so that the casing serves as a terminal for the intermediate cathode portion.

Figure 10:
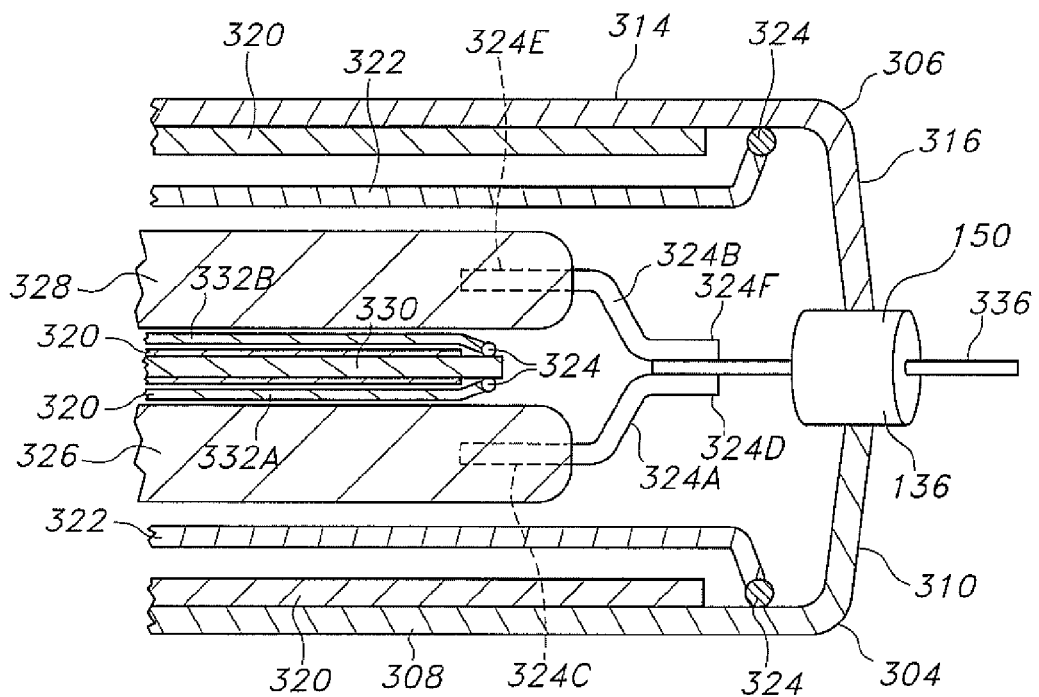
FIG. 10 is a fragmentary, top cross-sectional view of a dual anode capacitor design according to the present invention having anode leads 324A, 324B connected to a common lead 336 supported in an insulator and seal 136.

FIG. 10 illustrates an exemplary embodiment for connecting anode leads 324A, 324B in parallel for a dual-anode design 326, 328 of the capacitor 300 illustrated in FIG. 8. Anode lead 324A has a first portion 3240 that is embedded in the first pellet 326 and a second, outer portion 324D. Similarly, anode lead 324B for pellet 328 has a first portion 324E that is embedded in therein and a second, outer portion 324F. The outer portions 324D, 324F of the anode leads are bent toward and into contact with a feedthrough lead 336. In particular, anode lead 324A for the first pellet 326 contacts a first "side" of the feedthrough lead 336 opposite the anode lead 324B for the second anode pellet 328. The leads 324A, 324B are preferably laser welded to the feedthrough lead 236 extending through an insulator and seal structure 136 similar to that shown in FIG. 6.

FIG. 10 further shows that the exemplary mating clamshell casing member 304, 306 are each provided with a portion of an opening that is sized and shaped to receive the ferrule 150 for the insulator and seal structure 136 (FIG. 6). The casing member 304, 306 are preferably welded to the ferrule 150 as a hermetically sealed structure.

Figure 11:
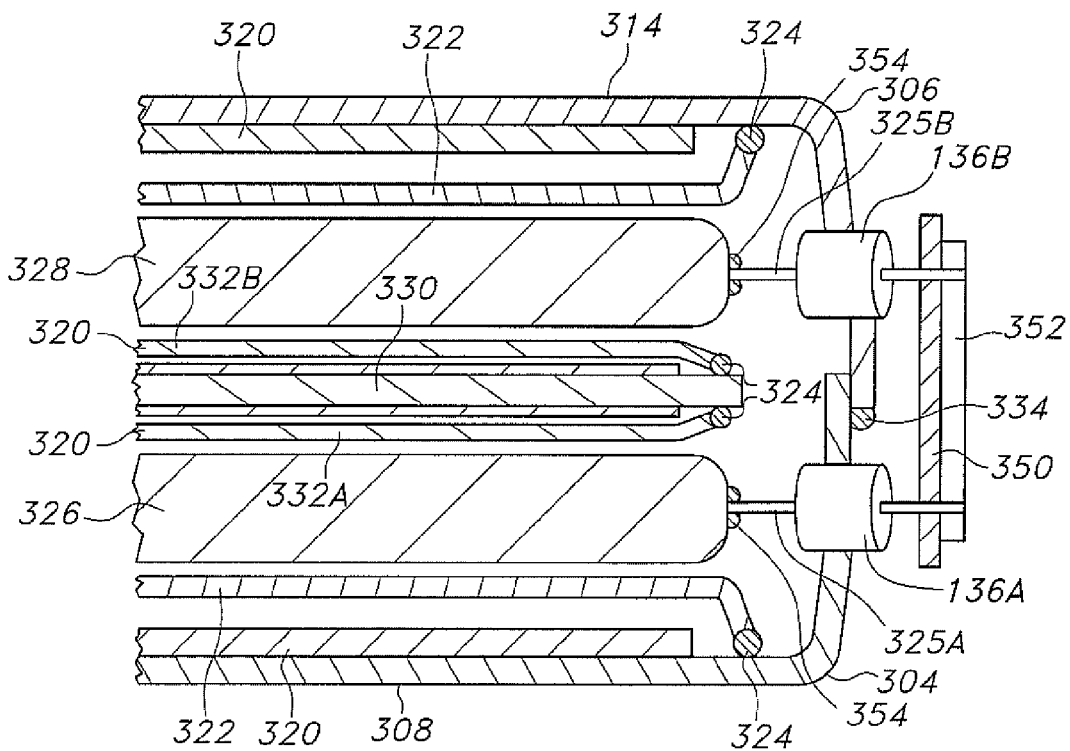
FIG. 11 is a fragmentary, top cross-sectional view of a dual anode capacitor design according to the present invention having anode leads 325A, 325B supported in respective insulator and seals 136A, 136B.

FIG. 11 illustrates another exemplary embodiment for connecting anode leads 325A, 325B in parallel for a dual-anode design 326, 328. Instead of the anode lead being connected to a common feedthrough lead 336, however, this embodiment has the leads for anode pellets 326, 328 supported in respective insulator and seal structures 136A, 136B, which are both similar to the insulator and seal structure 136 illustrated in FIG. 6. As shown, the insulator and seal structures 136A supporting anode lead 325A is supported in an opening with surrounding sidewall of a first clamshell-shaped casing member. The insulator and seal structure 136B supporting the anode lead 325B for the second anode 328 is supported in an opening in the surrounding sidewall for the second clamshell-shaped casing member 306. Distal portions of the anode leads 325A, 325E extend through an inner insulative plate 350 and an outer conductive plate 352 to thereby connect the anodes 326, 328 in parallel. Preferably, the distal ends of the anode leads 325A, 325B are flush with an outer surface of plate 352, which provides a suitable surface for connecting the capacitor to a load or device that it is intended to power.

It is noted that the exemplary embodiment shown in FIG. 11, the anode leads 325A, 325B are not embedded in the anode pellets 220, 222. Instead, they are connected to the anode pellets 326, 328 by welds 354.

The capacitors 100, 200, 300 and 300A of the present invention are not limited to single anode and dual anode designs. Instead, the capacitors may comprise additional anodes and cathode current collectors including cathode active material on the current collector faces thereof. Moreover, the anode active materials, cathode active material including coating processes, casing materials, separator materials and electrolytes described in detail with respect to capacitor 100 are equally applicable for use in capacitors 200, 300 and 300A.

Further, for a more detailed discussion regarding various casing constructions suitable for the present capacitors 100, 200, 300 and 300A, reference is made to U.S. Pat. No. 7,012,799 to Muffoletto et al. This patent is assigned to the assignee of the present invention and incorporated herein by reference.

Moreover, while not shown in the drawings, the various capacitors 100, 200, 300 and 300 preferably include a molded polymeric cradle or restraint for containing the anodes in the desired position should the capacitor experience high shock and vibration conditions. Suitable restraints are described in U.S. Pat. No. 7,085,126 to Muffoletto et al. and U.S. Pat. No. 7,092,242 to Gloss et al., which are assigned to the assignee of the present invention and incorporated herein by reference.

Although several embodiments of the invention have been described in detail, for purposes of illustration, various modifications of each may be made without departing from the spirit and scope of the invention. Accordingly, the invention is not to be limited, except as by the appended claims.

What is claimed is:

1. A capacitor, comprising:
  a) a casing comprising first and second casing members secured to each other;
  b) at least a first anode housed inside the casing;
  c) a first cathode comprising a first cathode active material supported by and in electrical contact with at least a portion of a first inner surface of the first casing member, the first cathode active material having a first active material perimeter;
  d) a first separator covering the first cathode active material, the first separator having a first separator peripheral margin that directly contacts the first inner surface of the first casing member, spaced from the active material perimeter of the first cathode active material, to thereby prevent direct physical contact between the first anode and the first cathode active material while allowing for ion flow therethrough; and
  e) a working electrolyte contacting the first anode and the first cathode.

2. The capacitor of claim 1 wherein the first separator is directly contacted to the first inner surface of the first casing member with an adhesive.

3. The capacitor of claim 2 wherein the adhesive is selected from the group consisting of hot melt glue, a polypropylene and polyethylene epoxy glue, and a PET tape with an acrylic adhesive.

4. The capacitor of claim 1 wherein a second cathode comprises a second cathode active material supported by and in electrical contact with at least a portion of a second inner surface of the second casing member, the second cathode active material having a second active material perimeter,
  wherein the first anode is intermediate the first and second cathodes, and
  wherein a second separator resides between the first anode and the second cathode, the second separator having a second separator peripheral margin that directly contacts the second inner surface of the second casing member, spaced from the active material perimeter of the second cathode active material, to thereby prevent direct physical contact between the first anode and the second cathode while allowing for ion flow therethrough.

5. The capacitor of claim 1 wherein a second anode is housed inside the casing, and wherein a third cathode comprises a cathode current collector having opposed major current collector faces supporting a third cathode active material, the third cathode being disposed intermediate the first and second anodes.

6. The capacitor of claim 5 wherein a third separator covers the third cathode active material supported on the opposed major current collector faces, and wherein a third peripheral margin of the third separator contacts the opposed major current collector faces, spaced from the third cathode active material.

7. The capacitor of claim 5 wherein the first anode is electrically connected in parallel with the second anode.

8. The capacitor of claim 5 wherein the first anode is not electrically connected to the second anode.

9. The capacitor of claim 5 wherein there are "n" anodes housed inside the casing, and wherein there are n−1 cathode current collectors supporting cathode active material on their respective opposed major current collector faces, one of the n−1 cathode current collectors residing intermediate side-by-side adjacent ones of the n anodes.

10. The capacitor of claim 9 wherein a separator covers the cathode active material contacted to each of the n−1 cathode current collectors so that a peripheral margin of the separator is in a surrounding, but spaced relationship with respect to a perimeter of the cathode active material.

11. The capacitor of claim 5 wherein an insulative seal is electrically connected to the first anode, and wherein the insulative seal comprises a feedthrough lead that extends outside the casing and is electrically isolated from the casing to thereby serve as an anode terminal.

12. The capacitor of claim 11 wherein the insulative seal is a hermetic seal comprising a sealing glass.

13. The capacitor of claim 11 wherein the insulative seal comprises a polymeric sealing material contacting both the feedthrough lead and a ferrule supported by the casing, but the insulative seal does not have a sealing glass.

14. The capacitor of claim 1 wherein the first casing member has a first face wall extending to a first surrounding side wall having an annular edge, and the second casing member has a second face wall secured to the annular edge of the first casing member.

15. The capacitor of claim 1 wherein the first anode comprises tantalum.

16. The capacitor of claim 15 wherein the first anode is a sintered tantalum pellet that is characterized as having been anodized to a formation voltage greater than zero up to 550 V.

17. The capacitor of claim 1 wherein the first cathode active material comprises ruthenium oxide.

18. A capacitor, comprising:
a) a casing comprising first and second casing members secured to each other;
b) a first anode housed inside the casing;
c) an insulative seal comprising a feedthrough lead electrically connected to the first anode inside the casing, wherein the feedthrough lead extends outside the casing and is electrically isolated from the casing to thereby serve as a terminal for the first anode;
d) a first cathode comprising a first cathode active material supported by and in electrical contact with at least a portion of a first inner surface of the first casing member, the first cathode active material having a first active material perimeter;
e) a first separator covering the first cathode active material, the first separator comprising a first separator peripheral margin that contacts the first inner surface of the first casing member in a spaced, but surrounding relationship with the first active material perimeter of the first cathode active material to thereby prevent direct physical contact between the first anode and the first cathode active material while allowing for ion flow therethrough; and
f) a working electrolyte contacting the first cathode and the first anode.

19. The capacitor of claim 18 wherein the first separator peripheral margin is contacted to the first inner surface of the first casing member with an adhesive.

20. The capacitor of claim 18 wherein a second cathode comprises a second cathode active material supported by and in electrical contact with at least a portion of a second inner surface of the second casing member, the first anode being intermediate the first and second cathodes, and wherein a second separator resides between the first anode and the second cathode, the second separator having a second separator peripheral margin that directly contacts the second inner surface of the second casing member in a spaced, but surrounding relationship with the second active material perimeter of the second cathode active material to thereby prevent direct physical contact between the first anode and the second cathode while allowing for ion flow therethrough.

21. The capacitor of claim 18 wherein a second anode is housed inside the casing, and wherein a third cathode comprises a cathode current collector having opposed major current collector faces supporting a third cathode active material, the third cathode being disposed intermediate the first and second anodes, and wherein a third separator covers the third cathode active material supported on the opposed major current collector faces, and wherein a third peripheral margin of the third separator contacts the opposed major current collector faces, spaced from the third cathode active material.

22. The capacitor of claim 18 wherein the first anode is electrically connected in parallel with the second anode.

23. The capacitor of claim 18 wherein the first anode is not electrically connected to the second anode.

* * * * *

UNITED STATES PATENT AND TRADEMARK OFFICE
CERTIFICATE OF CORRECTION

PATENT NO. : 9,875,855 B2
APPLICATION NO. : 15/334813
DATED : January 23, 2018
INVENTOR(S) : Anthony C. Perez et al.

It is certified that error appears in the above-identified patent and that said Letters Patent is hereby corrected as shown below:

In the Claims

Column 12, Line 14 (Claim 18, Line 17) after the word "that" insert --directly--

Signed and Sealed this
Fifteenth Day of May, 2018

Andrei Iancu
*Director of the United States Patent and Trademark Office*